United States Patent
Uramatsu et al.

(10) Patent No.: US 7,529,270 B2
(45) Date of Patent: May 5, 2009

(54) COMMUNICATION INFORMATION BANDWIDTH CONTROL APPARATUS AND METHOD

(75) Inventors: Naoyuki Uramatsu, Tokyo (JP); Shinji Takahashi, Tokyo (JP); Shinichi Shirasaka, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1282 days.

(21) Appl. No.: 10/241,709

(22) Filed: Sep. 12, 2002

(65) Prior Publication Data

US 2003/0095570 A1    May 22, 2003

(30) Foreign Application Priority Data

Nov. 16, 2001    (JP) .............................. P2001-351363

(51) Int. Cl.
*H04J 3/16* (2006.01)

(52) U.S. Cl. .................. 370/468; 370/477; 370/487; 370/494; 370/495; 709/226; 709/232; 725/96

(58) Field of Classification Search ............... 370/468, 370/477, 487, 493, 494, 495; 709/225, 226, 709/227, 228, 232, 236, 238, 243; 725/95, 725/96

See application file for complete search history.

(56) References Cited

U.S. PATENT DOCUMENTS 5,463,620 A * 10/1995 Sriram ..................... 370/412
5,831,666 A * 11/1998 Palmer et al. ............ 348/14.12
5,995,491 A * 11/1999 Richter et al. ............. 370/263
6,014,693 A * 1/2000 Ito et al. .................... 709/219

(Continued)

FOREIGN PATENT DOCUMENTS

JP        10-164533 A      6/1998

(Continued)

OTHER PUBLICATIONS

Kenji Honma, "New Product to Watch", Microsoft NetMeeting 3 Free Video Conference Software loaded with Remote Control Function, Nikkei PASOCON, Nikkei BP Inc. Jun. 28, 1999. No. 340. p. 172-173.

(Continued)

*Primary Examiner*—Hassan Kizou
*Assistant Examiner*—Brian T O'Connor
(74) *Attorney, Agent, or Firm*—Sughrue Mion, PLLC

(57) ABSTRACT

A bandwidth used in communication processing to transmit and receive different types of information via a communication line is monitored. A priority definition file previously defining the processing priority of information corresponding to a combination of the different types of information transmitted and received is provided. When the monitor result of monitoring the bandwidth indicates that the amount of information being transmitted/received is a given value or more, the priority definition file is referenced, the appropriate bandwidth for the information being transmitted/received is set in accordance with the processing priority, and the bandwidth of the information being transmitted/received is controlled based on the setup appropriate bandwidth.

10 Claims, 4 Drawing Sheets

U.S. PATENT DOCUMENTS

| | | | |
|---|---|---|---|
| 6,025,877 A * | 2/2000 | Chang et al. | 375/240.01 |
| 6,671,724 B1 * | 12/2003 | Pandya et al. | 709/226 |
| 6,834,390 B2 * | 12/2004 | Miller et al. | 719/322 |
| 6,947,990 B2 * | 9/2005 | Miller et al. | 709/226 |
| 7,002,918 B1 * | 2/2006 | Prieto et al. | 370/252 |
| 7,254,142 B2 * | 8/2007 | Hagsand et al. | 370/468 |
| 7,260,635 B2 * | 8/2007 | Pandya et al. | 709/226 |
| 7,260,641 B2 * | 8/2007 | Decker et al. | 709/233 |
| 7,293,094 B2 * | 11/2007 | Vaman et al. | 709/227 |
| 7,299,475 B2 * | 11/2007 | Miller et al. | 719/311 |
| 7,403,994 B1 * | 7/2008 | Vogl et al. | 709/227 |
| 7,415,038 B2 * | 8/2008 | Ullmann et al. | 370/468 |
| 7,457,312 B2 * | 11/2008 | Weiss et al. | 370/468 |

FOREIGN PATENT DOCUMENTS

JP     11-041574 A     2/1999

OTHER PUBLICATIONS

Koji Hashimoto. et al., Multimedia Conference Service by Soft Multimedia System. Information Processing Society collected papers, Feb. 15, 2000, vol. 41, No. 2. p. 384-395.

* cited by examiner

FIG. 2

| NUMBER | PROCESSING CONTENT CODE | NUMBER OF COMMUNICATION PROCESSING CODE | COMMUNICATION PROCESSING CODE 1 | COMMUNICATION PROCESSING CODE 2 | COMMUNICATION PROCESSING CODE 3 |
|---|---|---|---|---|---|
| 1 | A100 | 3 | B100 | B200 | B500 |
| 2 | A200 | 3 | B300 | B100 | B500 |
| 3 | A300 | 3 | B100 | B400 | B500 |
| 4 | A400 | 2 | B100 | B500 | |

FIG. 3

| PROCESSING CONTENT CODE | PROCESSING CONTENTS |
| --- | --- |
| A100 | DURING TRANSMISSION/RECEPTION OF DRAWING (PEN INPUT) INFORMATION |
| A200 | DURING TRANSMISSION/RECEPTION OF DISPLAY INFORMATION |
| A300 | DURING TRANSMISSION/RECEPTION OF CONFERENCE DATA FILE INFORMATION |
| A400 | DURING TRANSMISSION/RECEPTION OF ONLY VOICE INFORMATION, MONITOR VIDEO INFORMATION |

FIG. 4

| COMMUNICATION PROCESSING CODE | COMMUNICATION PROCESSING CONTENT | APPROPRIATE BANDWIDTH |
| --- | --- | --- |
| B100 | TRANSMISSION/RECEPTION OF VOICE INFORMATION | 16Kbps |
| B200 | TRANSMISSION/RECEPTION OF DRAWING (PEN INPUT) INFORMATION | 16Kbps |
| B300 | TRANSMISSION/RECEPTION OF DISPLAY INFORMATION | 96Kbps |
| B400 | TRANSMISSION/RECEPTION OF CONFERENCE DATA FILE INFORMATION | 96Kbps |
| B500 | TRANSMISSION/RECEPTION OF MONITOR VIDEO INFORMATION (KEY FRAME) | 40Kbps |
| B500 | TRANSMISSION/RECEPTION OF MONITOR VIDEO INFORMATION (NORMAL FRAME) | 24Kbps |

US 7,529,270 B2

COMMUNICATION INFORMATION BANDWIDTH CONTROL APPARATUS AND METHOD

CROSS REFERENCE OF RELATED APPLICATION

This application is based on and claims priority under 35 U.S.C. §119 with respect to Japanese Patent Application No. 2001-351363 filed on Nov. 16, 2001, the entire content of which is incorporated herein by reference.

BACKGROUND OF THE INVENTION

1. Field of the Invention

This invention relates to a communication information bandwidth control apparatus and method for controlling the bandwidth of information transmitted and received via a communication line.

2. Description of the Related Art

Hitherto, a videoconference system has been known as a communication tool for conducting a conference with the associated party at a remote location. The videoconference system comprises a plurality of terminals connected to each other via a communication line, and voice information containing user's voice, monitor video information containing a user's monitor image, and the like are transmitted and received between the terminals. A data conference system is known as a similar communication tool. The data conference system also comprises a plurality of terminals connected to each other via a communication line, and display information containing displayed conference material, drawing (pen input) information containing drawing (pen input) of the user, and the like are transmitted and received between the terminals.

In recent years, a network conference system in such a mode comprising a videoconference system and a data conference system in combination has been proposed. In the network conference system, not only voice information containing user's voice, monitor video information containing a user's monitor image, etc., but also display information containing displayed conference material, drawing (pen input) information containing drawing (pen input) of the user, and the like are transmitted and received between terminals.

By the way, to transmit and receive the information between the terminals in the network conference system, it is possible to assign the bandwidth of the communication line used to each type of information. However, for example, if an attempt is made to transmit and receive the display information having a large information amount (requiring a wide bandwidth) in addition to the voice information and the monitor video information, the voice information is not sufficiently transmitted or received and it is feared that the user's voice may be interrupted.

SUMMARY OF THE INVENTION

It is therefore an object of the invention to provide a communication information bandwidth control apparatus and method whereby, for example, in a network conference system, if display information having a large information amount (requiring a wide bandwidth) is transmitted and received in addition to voice information and monitor video information, the voice information is sufficiently transmitted and received and the conference can be smoothly advanced without interrupting the user's voice.

First, according to the invention, there is provided a communication information bandwidth control apparatus comprising communication processing means for transmitting and receiving different types of information via a communication line; band use state monitor means for monitoring the bandwidth used in the communication processing means to transmit and receive the different types of information; priority definition means having a priority definition file previously defining the processing priority of information corresponding to a combination of the different types of information transmitted and received in the communication processing means; and bandwidth control means, when the monitor result of the band use state monitor means indicates that the amount of information being transmitted/received in the communication processing means is a given value or more, the bandwidth control means for referencing the priority definition file of the priority definition means, setting the appropriate bandwidth for the information being transmitted/received in accordance with the processing priority, and controlling the bandwidth of the information being transmitted/received in the communication processing means based on the setup appropriate bandwidth.

According to the communication information bandwidth control apparatus, when the monitor result of the band use state monitor means indicates that the amount of information being transmitted/received in the communication processing means is the given value or more, the priority definition file of the priority definition means is referenced, the appropriate bandwidth for the information being transmitted/received is set in accordance with the processing priority, and the bandwidth of the information being transmitted/received in the communication processing means is controlled based on the setup appropriate bandwidth.

Second, the communication information bandwidth control apparatus of the invention is characterized by the fact that in the communication information bandwidth control apparatus described first as the bandwidth control apparatus in a network conference system wherein the communication information bandwidth control apparatus transmits and receives information to conduct a conference via the communication line, when the combination of the different types of information transmitted and received in the communication processing means contains voice information, drawing information, and monitor video information as the information to conduct a conference, the priority definition file of the priority definition means is set so as to lower the processing priority in the order of the voice information, the drawing information, and the monitor video information.

According to the communication information bandwidth control apparatus, when the combination of the different types of information transmitted and received in the communication processing means contains voice information, drawing information, and monitor video information as the information to conduct a conference, the processing priority is lowered in the order of the voice information, the drawing information, and the monitor video information.

Third, the communication information bandwidth control apparatus of the invention is characterized by the fact that in the communication information bandwidth control apparatus described first as the bandwidth control apparatus in a network conference system wherein the communication information bandwidth control apparatus transmits and receives information to conduct a conference via the communication line, when the combination of the different types of information transmitted and received in the communication processing means contains voice information, display information, and monitor video information as the information to conduct a conference, the priority definition file of the priority definition means is set so as to lower the processing priority in the order of the display information, the voice information, and the monitor video information.

According to the communication information bandwidth control apparatus, when the combination of the different types of information transmitted and received in the communication processing means contains voice information, display information, and monitor video information as the information to conduct a conference, the processing priority is lowered in the order of the display information, the voice information, and the monitor video information.

Fourthly, the communication information bandwidth control apparatus of the invention is characterized by the fact that in the communication information bandwidth control apparatus described first as the bandwidth control apparatus in a network conference system wherein the communication information bandwidth control apparatus transmits and receives information to conduct a conference via the communication line, when the combination of the different types of information transmitted and received in the communication processing means contains voice information, conference data file information, and monitor video information as the information to conduct a conference, the priority definition file of the priority definition means is set so as to lower the processing priority in the order of the voice information, the conference data file information, and the monitor video information.

According to the communication information bandwidth control apparatus, when the combination of the different types of information transmitted and received in the communication processing means contains voice information, conference data file information, and monitor video information as the information to conduct a conference, the processing priority is lowered in the order of the voice information, the conference data file information, and the monitor video information.

Fifthly, the communication information bandwidth control apparatus of the invention is characterized by the fact that in the communication information bandwidth control apparatus described first as the bandwidth control apparatus in a network conference system wherein the communication information bandwidth control apparatus transmits and receives information to conduct a conference via the communication line, when the combination of the different types of information transmitted and received in the communication processing means contains voice information and monitor video information as the information to conduct a conference, the priority definition file of the priority definition means is set so as to lower the processing priority in the order of the voice information and the monitor video information.

According to the communication information bandwidth control apparatus, when the combination of the different types of information transmitted and received in the communication processing means contains voice information and monitor video information as the information to conduct a conference, the processing priority is lowered in the order of the voice information and the monitor video information.

Sixthly, according to the invention, there is provided a communication information bandwidth control method comprising the steps of monitoring the bandwidth used in communication processing means to transmit and receive different types of information via a communication line; when the monitor result in the step of monitoring the bandwidth indicates that the amount of information being transmitted/received in the communication processing means is a given value or more, referencing a priority definition file previously defining the processing priority of information corresponding to a combination of the different types of information transmitted and received in the communication processing means, and setting the appropriate bandwidth for the information being transmitted/received in accordance with the processing priority; and controlling the bandwidth of the information being transmitted/received in the communication processing means based on the setup appropriate bandwidth.

According to the communication information bandwidth control method, when the monitor result of monitoring the bandwidth indicates that the amount of information being transmitted/received in the communication processing means is the given value or more, the priority definition file is referenced, the appropriate bandwidth for the information being transmitted/received is set in accordance with the processing priority, and the bandwidth of the information being transmitted/received in the communication processing means is controlled based on the setup appropriate bandwidth.

Seventhly, the communication information bandwidth control method of the invention is characterized by the fact that in a network conference system wherein information to conduct a conference is transmitted and received via the communication line according to the communication information bandwidth control method described sixthly, when the combination of the different types of information transmitted and received in the communication processing means contains voice information, drawing information, and monitor video information as the information to conduct a conference, the priority definition file is set so as to lower the processing priority in the order of the voice information, the drawing information, and the monitor video information.

According to the communication information bandwidth control method, when the combination of the different types of information transmitted and received in the communication processing means contains voice information, drawing information, and monitor video information as the information to conduct a conference, the processing priority is lowered in the order of the voice information, the drawing information, and the monitor video information.

Eighthly, the communication information bandwidth control method of the invention is characterized by the fact that in a network conference system wherein information to conduct a conference is transmitted and received via the communication line according to the communication information bandwidth control method described sixthly, when the combination of the different types of information transmitted and received in the communication processing-means contains voice information, display information, and monitor video information as the information to conduct a conference, the priority definition file is set so as to lower the processing priority in the order of the display information, the voice information, and the monitor video information.

According to the communication information bandwidth control method, when the combination of the different types of information transmitted and received in the communication processing means contains voice information, display information, and monitor video information as the information to conduct a conference, the processing priority is lowered in the order of the display information, the voice information, and the monitor video information.

Ninthly, the communication information bandwidth control method of the invention is characterized by the fact that in a network conference system wherein information to conduct a conference is transmitted and received via the communication line according to the communication information bandwidth control method described sixthly, when the combination of the different types of information transmitted and received in the communication processing means contains voice information, conference data file information, and monitor video information as the information to conduct a conference, the priority definition file is set so as to lower the processing priority in the order of the voice information, the conference data file information, and the monitor video information.

According to the communication information bandwidth control method, when the combination of the different types of information transmitted and received in the communication processing means contains voice information, conference data file information, and monitor video information as the information to conduct a conference, the processing priority is lowered in the order of the voice information, the conference data file information, and the monitor video information.

Tenthly, the communication information bandwidth control method of the invention is characterized by the fact that in a network conference system wherein information to conduct a conference is transmitted and received via the communication line according to the communication information bandwidth control method described sixthly, when the combination of the different types of information transmitted and received in the communication processing means contains voice information and monitor video information as the information to conduct a conference, the priority definition file is set so as to lower the processing priority in the order of the voice information and the monitor video information.

According to the communication information bandwidth control method, when the combination of the different types of information transmitted and received in the communication processing means contains voice information and monitor video information as the information to conduct a conference, the processing priority is lowered in the order of the voice information and the monitor video information.

BRIEF DESCRIPTION OF THE DRAWINGS

In the accompanying drawings:

FIG. 2 is a drawing to show an example of a priority definition file of a priority definition section in a network conference section installed in the terminal in FIG. 1;

FIG. 3 is a drawing to show the processing contents indicated by processing content codes in the priority definition file in FIG. 2;

FIG. 4 is a drawing to show the communication processing contents indicated by communication processing codes in the priority definition file in FIG. 2.

DETAILED DESCRIPTION OF THE PREFERRED EMBODIMENTS

Referring now to the accompanying drawings, a preferred embodiment of the invention will be described. The embodiment is applied to a network conference system.

Figure 1:
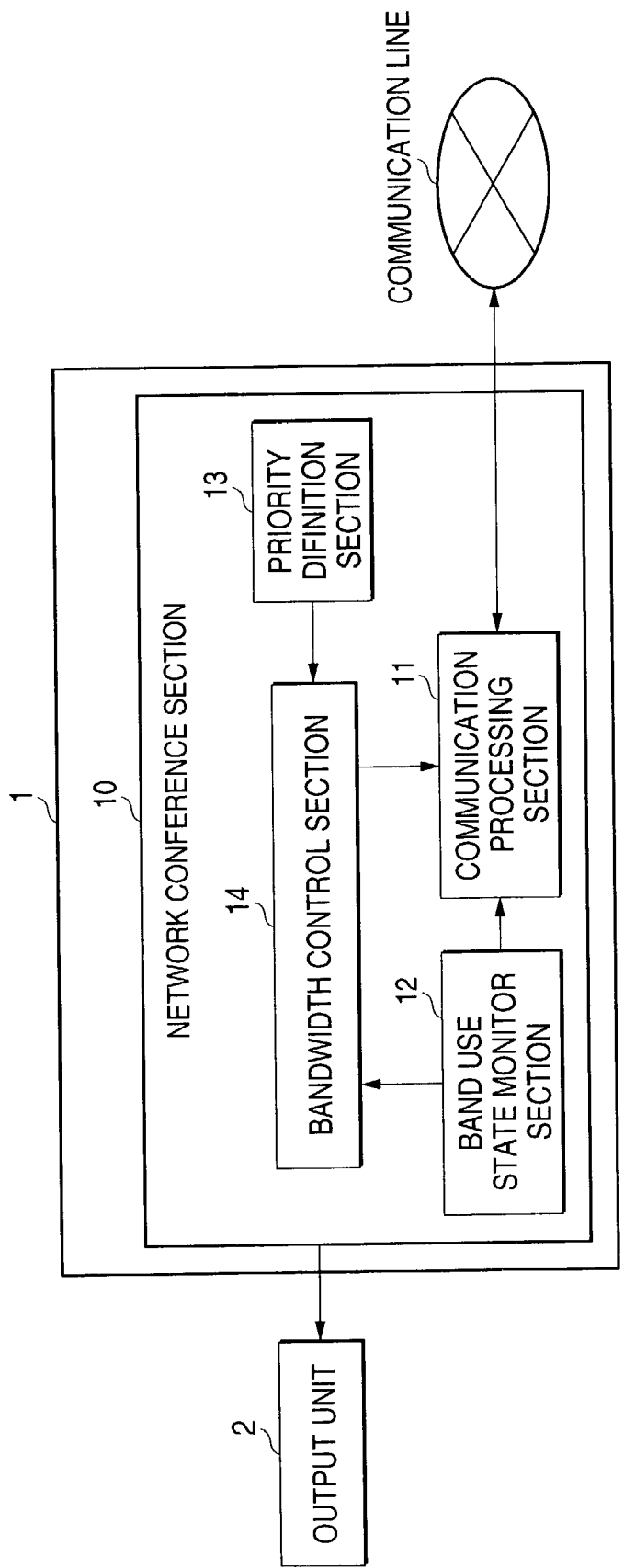
FIG. 1 is a block diagram to show the main configuration of a terminal in one embodiment of the invention forming a part of a network conference system.

FIG. 1 is a block diagram to show the main configuration of a terminal in the embodiment forming a part of a network conference system. In FIG. 1, a terminal 1 implemented as a personal computer, etc., comprises a network conference section 10 as a bandwidth control apparatus of communication information according to the embodiment. The network conference section 10 is connected to an output unit 2 implemented as a plasma display panel (PDP), etc., to display video information in the network conference section 10. A voice information output unit is not shown.

The network conference section 10 includes a communication processing section 11 for transmitting and receiving different types of information to conduct a conference via a communication line such as a dialup or dedicated line (voice information, drawing (pen input) information, display information, conference data file information, monitor video information, etc.,), a band use state monitor section 12 for monitoring the bandwidth used in the communication processing section 11 to transmit and receive the different types of information, a priority definition section 13 having a priority definition file previously defining the processing priority of information corresponding to a combination of the different types of information transmitted and received in the communication processing section 11, and a bandwidth control section 14, when the monitor result of the band use state monitor section 12 indicates that the amount of information being transmitted/received in the communication processing section 11 is a given value or more, the bandwidth control section 14 for referencing the priority definition file of the priority definition section 13, setting the appropriate bandwidth for the information being transmitted/received in accordance with the processing priority, and controlling the bandwidth of the information being transmitted/received in the communication processing section 11 based on the setup appropriate bandwidth. The voice information means information containing user's voice, the drawing (pen input) information means information containing drawing (pen input) of the user, the display information means information containing displayed conference material, the conference data file information means information containing a data file of the conference material, and the monitor video information means information containing a user's monitor image.

FIG. 2 is a drawing to show an example of the priority definition file of the priority definition section 13. In FIG. 2, the priority definition file comprises four rows (Nos. 1 to 4) each including the number (No.) indicating the operation state, processing content code, the number of communication processing codes, communication processing code 1 having the first (highest) processing priority, communication processing code 2 having the second processing priority, and communication processing code 3 having the third processing priority. The processing content code indicates the processing contents as shown in FIG. 3. That is, "A100" indicates that drawing (pen input) information is being transmitted/received in addition to voice information, monitor video information, "A200" indicates that display information is being transmitted/received in addition to voice information, monitor video information, "A300" indicates that conference data file information is being transmitted/received in addition to voice information, monitor video information, and "A400" indicates that only voice information, monitor video information is being transmitted/received. The communication processing code indicates the communication processing contents as shown in FIG. 4. That is, "B100" indicates transmission/reception of voice information, "B200" indicates transmission/reception of drawing (pen input) information, "B300" indicates transmission/reception of display information, "B400" indicates transmission/reception of conference data file information, and "B500" indicates both or either of transmission/reception of monitor video information (key frame) and transmission/reception of monitor video information (normal frame). The transmission/reception of monitor video information (key frame) refers to transmission/ reception of the complete information of the frame and the transmission/reception of monitor video information (normal frame) refers to transmission/reception of difference information indicating the difference from the preceding frame. Generally, the information amount of the key frame is larger than that of the normal frame. Usually, several normal frames are transmitted/received following one key frame and this sequence is repeated.

Further, in the priority definition file shown in FIG. 2, the processing priority is lowered in the order of the voice information, the drawing information, and the monitor video information during transmission/reception of the drawing (pen input) information in addition to the voice information, the monitor video information (processing content code "A100"); the processing priority is lowered in the order of the display information, the voice information, and the monitor video information during transmission/reception of the display information in addition to the voice information, the monitor video information (processing content code "A200"); the processing priority is lowered in the order of the voice information, the conference data file information, and the monitor video information during transmission/reception of the conference data file information in addition to the voice information, the monitor video information (processing content code "A300"); and the processing priority is lowered in the order of the voice information and the monitor video information during transmission/reception of only the voice information, the monitor video information (processing content code "A400").

As shown in FIG. 4, for example, 16 Kbps as the appropriate bandwidth is assigned to transmission/reception of the voice information (communication processing code "B100"); 16 Kbps as the appropriate bandwidth is assigned to transmission/reception of the drawing (pen input) information (communication processing code "B200"); 96 Kbps as the appropriate bandwidth is assigned to transmission/reception of the display information (communication processing code "B300"); 96 Kbps as the appropriate bandwidth is assigned to transmission/reception of the conference data file information (communication processing code "B400"); 40 Kbps as the appropriate bandwidth is assigned to transmission/reception of the monitor video information (key frame) (communication processing code "B500"); and 24 Kbps as the appropriate bandwidth is assigned to transmission/reception of the monitor video information (normal frame) (communication processing code "B500").

Figure 5:
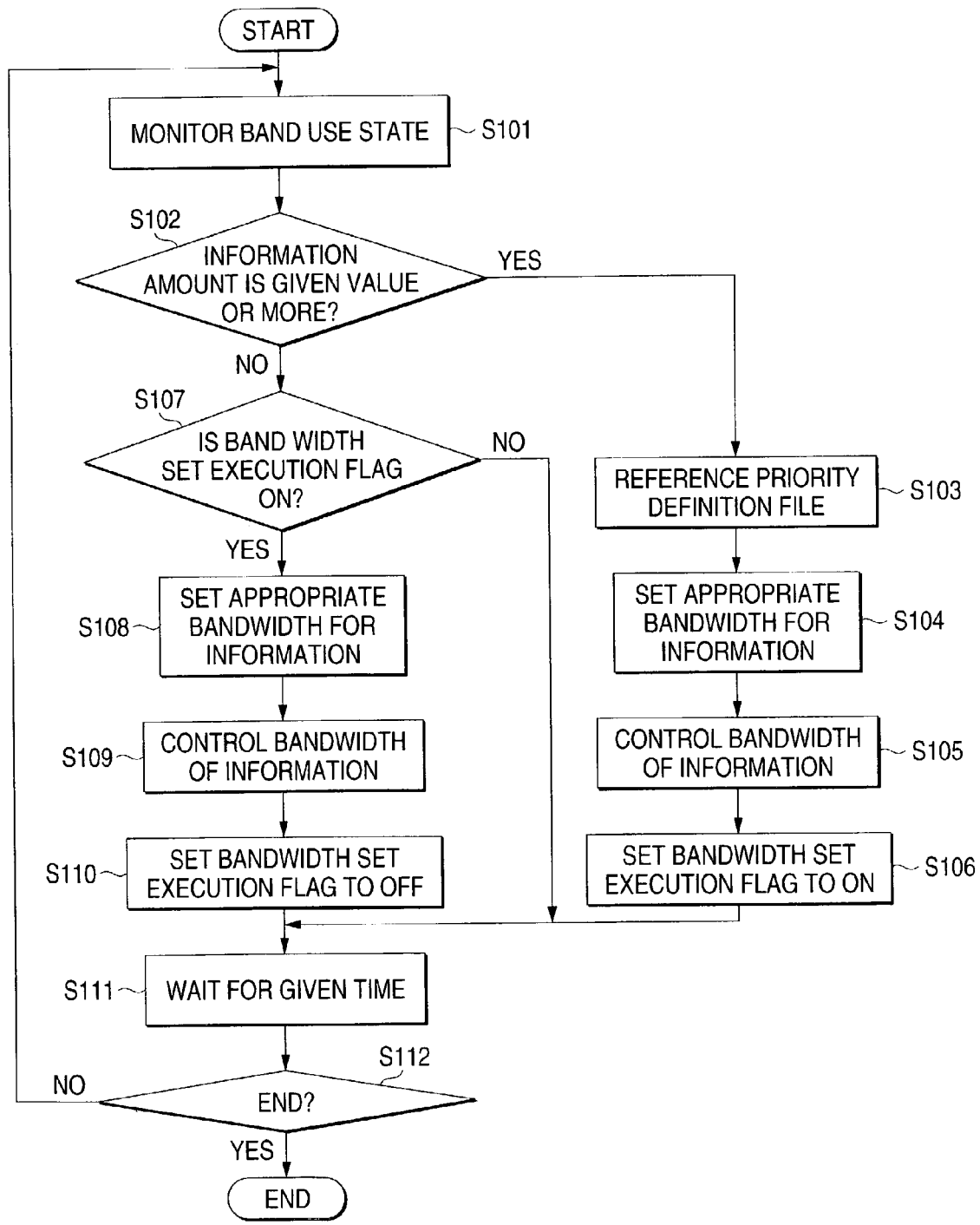
FIG. 5 is a flowchart to show the communication information bandwidth control operation in the network conference section in FIG. 1.

FIG. 5 is a flowchart to show the communication information bandwidth control operation in the network conference section 10. In FIG. 5, first the band use state monitor section 12 starts to monitor the bandwidth used in the communication processing section 11 to transmit and receive the different types of information to conduct a conference (step S101). Next, the bandwidth control section 14 determines whether or not the monitor result of the band use state monitor section 12 indicates that the amount of information being transmitted/received in the communication processing section 11 is a given value or more (step S102). If the amount of information being transmitted/received in the communication processing section 11 is the given value or more at step S102 (YES), the bandwidth control section 14 references the priority definition file of the priority definition section 13 (step S103), sets the appropriate bandwidth for the information being transmitted/received in accordance with the processing priority previously defined in the priority definition file (step S104), and controls the bandwidth of the information being transmitted/received in the communication processing section 11 based on the setup appropriate bandwidth (step S105). Next, a bandwidth set execution flag for enabling setting of the bandwidth of the information is set to ON (step S106) and steps on and after step S111 described later are executed.

On the other hand, if the amount of information being transmitted/received in the communication processing section 11 is not the given value or more at step S102 (NO), whether or not the bandwidth set execution flag is ON is determined (step S107). If the bandwidth set execution flag is OFF at step S107 (NO), steps on and after step S111 described later are executed. On the other hand, if the bandwidth set execution flag is, ON at step S107 (YES), the bandwidth control section 14 sets the appropriate bandwidth for the information being transmitted/received (step S108) and controls the bandwidth of the information being transmitted/received in the communication processing section 11 based on the setup appropriate bandwidth (step S109). Next, the bandwidth set execution flag is set to OFF (step S110) and a wait is made for a given time (step S111) and then whether or not the end is reached is determined (step S112). If the end is reached at step S112 (YES), the operation is terminated. If the end is not reached (NO), step S101 and the later steps are again executed.

In the communication information bandwidth control operation, the bandwidth of the information being transmitted/received in the communication processing section 11 specifically is controlled as follows: For example, assuming that the bandwidth of the communication line used is 128 Kbps, at the normal conference time indicated by the processing content code "A100," the bandwidth of the voice information is controlled to 16 Kbps, the bandwidth of the drawing (pen input) information is controlled to 16 Kbps, and the bandwidth of the monitor video information is controlled to 40 Kbps (key frame) and 56 Kbps (normal frame: 2.7 frames). In other words, at the normal conference time indicated by the processing content code "A100," the 16-Kbps bandwidth is provided for the voice information, the 16-Kbps bandwidth is provided for the drawing (pen input) information, and the 40-Kbps (key frame) bandwidth and the 56-Kbps (normal frame: 2.7 frames) bandwidth are provided for the monitor video information. At the display information distribution time indicated by the processing content code "A200," the bandwidth of the display information is controlled to 96 Kbps, the bandwidth of the voice information is controlled to 16 Kbps, and the bandwidth of the monitor video information is controlled to 16 Kbps (key frame: 0.4 frames) In other words, at the display information distribution time indicated by the processing content code "A200," first the 96-Kbps bandwidth is provided for the display information having the first (highest) priority (communication processing code "B300"), next the 16-Kbps bandwidth is provided for the voice information having the second priority (communication processing code "B100"), and last the 16-Kbps (key frame: 0.4 frames) bandwidth provided by performing calculation processing (128 Kbps−(96 Kbps+16 Kbps)) is assigned to the monitor video information having the third priority (communication processing code "B500").

Thus, in the network conference section 10 of the embodiment, when the monitor result of the band use state monitor section 12 indicates that the amount of information being transmitted/received in the communication processing section 11 is the given value or more, the priority definition file of the priority definition section 13 is referenced, the appropriate bandwidth is set for the information being transmitted/received in accordance with the processing priority, and the bandwidth of the information being transmitted/received in the communication processing section 11 is controlled based on the setup appropriate bandwidth. Therefore, for example, if the display information having a large information amount (requiring a wide bandwidth) is transmitted and received in addition to the voice information and the monitor video information, the voice information is sufficiently transmitted and received and the conference can be smoothly advanced without interrupting the user's voice. In the embodiment, the voice information is handled as information having high processing priority, but any other information may be handled as information having high processing priority depending on the application or the state, needless to say. The information processing priority can be customized matching the user's requirements, and customer satisfaction can be more enhanced.

As seen from the description made above, according to the invention, for example, in the network conference system, if the display information having a large information amount (requiring a wide bandwidth) is transmitted and received in addition to the voice information and the monitor video information, the voice information is sufficiently transmitted and received and the conference can be smoothly advanced without interrupting the user's voice.

What is claimed is:

1. A communication information bandwidth control apparatus comprising:
   a communication processor adapted to transmit and receive different types of information including voice information and monitor video information via a communication line;
   a band use state monitor adapted to monitor a bandwidth used in said communication processor to transmit and receive the different types of information:
   a priority definition unit having a priority definition file including:
      a processing content code which defines the processing priority of information corresponding to a combination of the different types of information transmitted and received in said communication processor; and
      a communication processing code which indicates communication processing contents of the information; and
   a bandwidth controller, when the monitor result of said band use state monitor indicates that the amount of information being transmitted/received in said communication processor is a given value or more, said bandwidth controller for controlling the bandwidth of the information being transmitted/received in said communication processor based on the setup appropriate bandwidth which is set in the communication processing code of the information being transmitted/received by referencing the processing priority of the processing content code,
   wherein, when the voice information and the monitor video information are transmitted and received, the priority definition unit is set so as to provide a higher processing priority for the voice information and lower processing priority for the monitor video information.

2. The communication information bandwidth control apparatus as claimed in claim 1 as the bandwidth control apparatus in a network conference system wherein said communication information bandwidth control apparatus transmits and receives information to conduct a conference via the communication line, wherein when the combination of the different types of information transmitted and received in said communication processor contains voice information, drawing information, and monitor video information as the information to conduct a conference, the priority definition file of said priority definition unit is set so as to provide a higher processing priority for the voice information, an intermediate processing priority for the drawing information, and a lower processing priority for the monitor video information.

3. The communication information bandwidth control apparatus as claimed in claim 1 as the bandwidth control apparatus in a network conference system wherein said communication information bandwidth control apparatus transmits and receives information to conduct a conference via the communication line, wherein when the combination of the different types of information transmitted and received in said communication processor contains voice information, conference data file information, and monitor video information as the information to conduct a conference, the priority definition file of said priority definition unit is set so as to provide a higher processing priority for the voice information, an intermediate processing priority for the conference data file information, and a lower processing priority for the monitor video information.

4. The communication information bandwidth control apparatus as claimed in claim 1 as the bandwidth control apparatus in a network conference system wherein said communication information bandwidth control apparatus transmits and receives information to conduct a conference via the communication line, wherein when the combination of the different types of information transmitted and received in said communication processor contains voice information and monitor video information as the information to conduct a conference, the priority definition file of said priority definition unit is set so as to provide a higher processing priority for the voice information and a lower processing priority for the monitor video information.

5. A communication information bandwidth control apparatus as the bandwidth control apparatus in a network conference system, the communication information bandwidth control apparatus comprising:
   a communication processor adapted to transmit and receive different types of information including voice information and monitor video information via a communication line;
   a band use state monitor adapted to monitor a bandwidth used in said communication processor to transmit and receive the different types of information;
   a priority definition unit having a priority definition file including:
      a processing content code which defines the processing priority of information corresponding to a combination of the different types of information transmitted and received in said communication processor; and
      a communication processing code which indicates communication processing contents of the information; and
   a bandwidth controller, when the monitor result of said band use state monitor indicates that the amount of information being transmitted/received in said communication processor is a given value or more, said bandwidth controller for controlling the bandwidth of the information being transmitted/received in said communication processor based on the setup appropriate bandwidth which is set in the communication processing code of the information being transmitted/received by referencing the processing priority of the processing content code,
   wherein when the voice information and the monitor video information are transmitted and received, the priority definition unit is set so as to provide a higher processing priority for the voice information and lower processing priority for the monitor video information, and wherein said communication information bandwidth control apparatus transmits and receives information to conduct a conference via the communication line, wherein when the combination of the different types of information transmitted and received in said communication processor contains voice information, display information, and monitor video information as the information to conduct a conference, the priority definition file of said priority definition unit is set so as to provide a higher processing priority for the display information, an intermediate processing priority for the voice information, and a lower processing priority for the monitor video information.

6. A communication information bandwidth control method comprising the steps of:
   monitoring a bandwidth used in communication processor to transmit and receive different types of information including voice information and monitor video information via a communication line;
   when the monitor result in said step of monitoring the bandwidth indicates that the amount of information being transmitted/received in the communication processor is a given value or more, referencing a processing content code of a priority definition file previously defining the processing priority of information corresponding to a combination of the different types of information transmitted and received in the communication processor, and setting the appropriate bandwidth for the information being transmitted/received in accordance with a communication code of the information; and
   controlling the bandwidth of the information being transmitted/received in the communication processor based on the appropriate bandwidth,
   wherein, when the voice information and the monitor video information are transmitted and received, the priority definition file is set so as to provide a higher processing priority for the voice information and lower processing priority for the monitor video information.

7. The communication information bandwidth control method as claimed in claim 6 in a network conference system wherein information to conduct a conference is transmitted and received via the communication line according to said communication information bandwidth control method, wherein when the combination of the different types of information transmitted and received in the communication processor contains voice information, drawing information, and monitor video information as the information to conduct a conference, the priority definition file is set so as to provide a higher processing priority for the voice information, an intermediate processing priority for the drawing information, and a lower processing priority for the monitor video information.

8. The communication information bandwidth control method as claimed in claim 6 in a network conference system wherein information to conduct a conference is transmitted and received via the communication line according to said communication information bandwidth control method, wherein when the combination of the different types of information transmitted and received in the communication processor contains voice information, conference data file information, and monitor video information as the information to conduct a conference, the priority definition file is set so as to provide a higher processing priority for the voice information, an intermediate processing priority for the conference data file information, and a lower processing priority for the monitor video information.

9. The communication information bandwidth control method as claimed in claim 6 in a network conference system wherein information to conduct a conference is transmitted and received via the communication line according to said communication information bandwidth control method, wherein when the combination of the different types of information transmitted and received in the communication processor contains voice information and monitor video information as the information to conduct a conference, the priority definition file is set so as to provide a higher processing priority for the voice information and a lower processing priority for the monitor video information.

10. A communication information bandwidth control method in a network conference system, said control method comprising:
    monitoring a bandwidth used in a communication processor to transmit and receive different types of information including voice information and monitor video information via a communication line;
    when a monitor result in said monitoring a bandwidth indicates that an amount of information being transmitted/received in the communication processor is a given value or more, referencing a processing content code of a priority definition file previously defining a processing priority of information corresponding to a combination of the different types of information transmitted and received in the communication processor, and setting an appropriate bandwidth for the information being transmitted/received in accordance with a communication code of the information; and
    controlling the bandwidth of the information being transmitted/received in the communication processor based on the appropriate bandwidth,
    wherein when the voice information and the monitor video information are transmitted and received, the priority definition file is set to provide higher processing priority for the voice information and lower processing priority for the monitor video information, and
    wherein information to conduct a conference is transmitted and received via the communication line according to said communication information bandwidth control method, wherein when the combination of the different types of information transmitted and received in the communication processor contains voice information, display information, and monitor video information as the information to conduct a conference, the priority definition file is set to provide higher processing priority for the display information, intermediate processing priority for the voice information, and lower processing priority for the monitor video information.

* * * * *